2 Sheets—Sheet 1.
G. G. LOBDELL.
Car Wheel.
No. 85,745.   Patented Jan. 12, 1869.
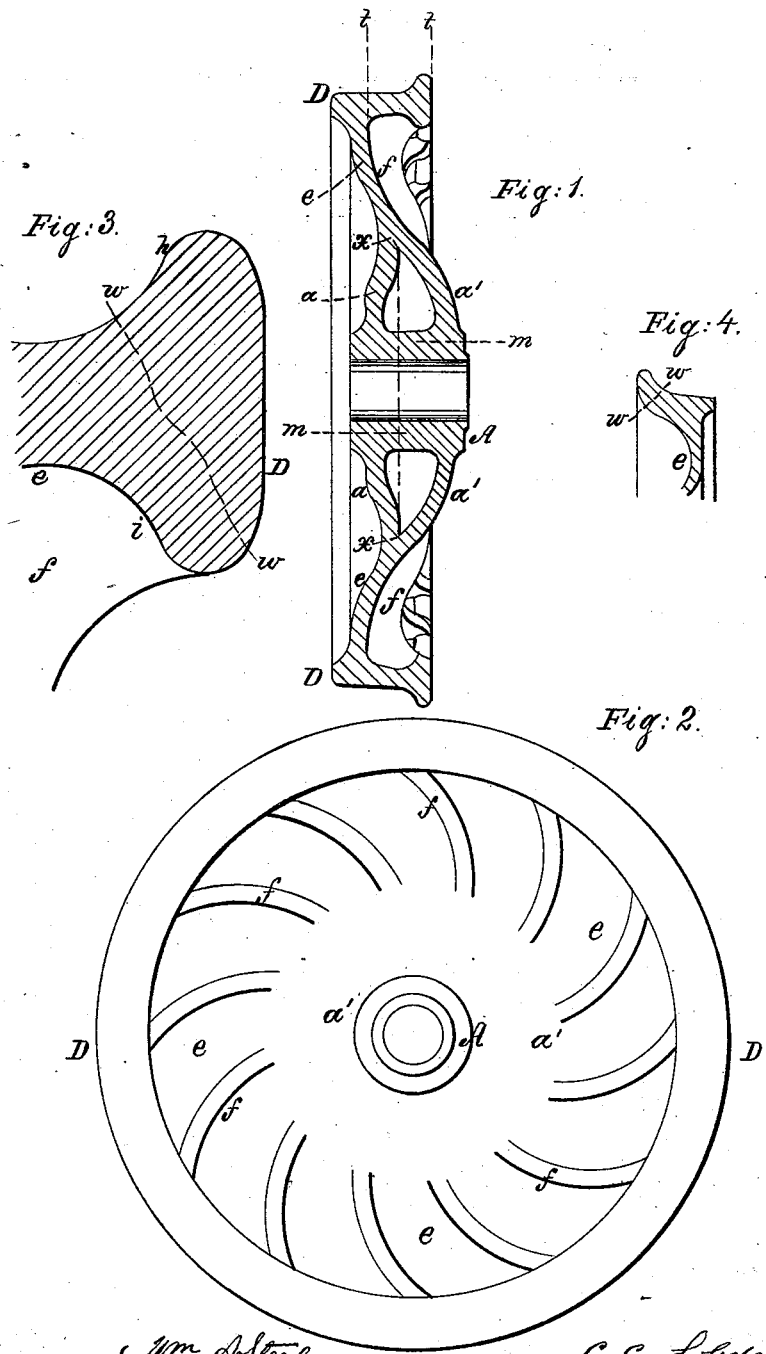

G. G. LOBDELL.
Car Wheel.

No. 85,745.

2 Sheets—Sheet 2.

Patented Jan. 12, 1869.

Witnesses.
Frank Tripp
John Bulkley

G. G. Lobdell
By his atty
H. Howson

UNITED STATES PATENT OFFICE.

GEORGE G. LOBDELL, OF WILMINGTON, DELAWARE.

Letters Patent No. 85,745, dated January 12, 1869.

IMPROVED CAST-IRON CAR-WHEEL.

The Schedule referred to in these Letters Patent and making part of the same.

*To all whom it may concern:*

Be it known that I, GEORGE G. LOBDELL, of Wilmington, Delaware, have invented an Improvement in Cast-Iron Car-Wheels; and I do hereby declare the following to be a full, clear, and exact description of the same.

My invention consists of an improvement, fully described hereafter, in the cast-iron car-wheel for which Letters Patent were granted to Nathan Washburn, October 8, 1850, my improvement being such as to add strength to the wheel at the point where it is most liable to be broken.

In order to enable others skilled in the art to make my invention, I will now proceed to describe the manner of carrying it into effect, reference being had to the accompanying drawing, which forms a part of this specification, and in which—

Figure 6:
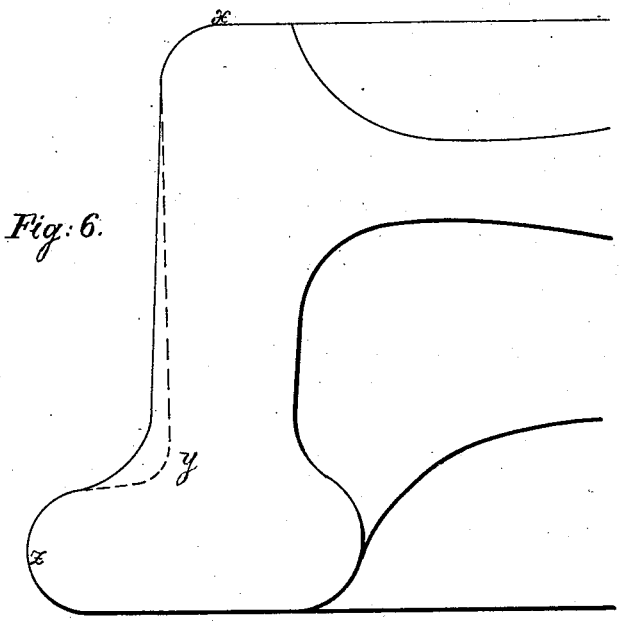
Figure 5:
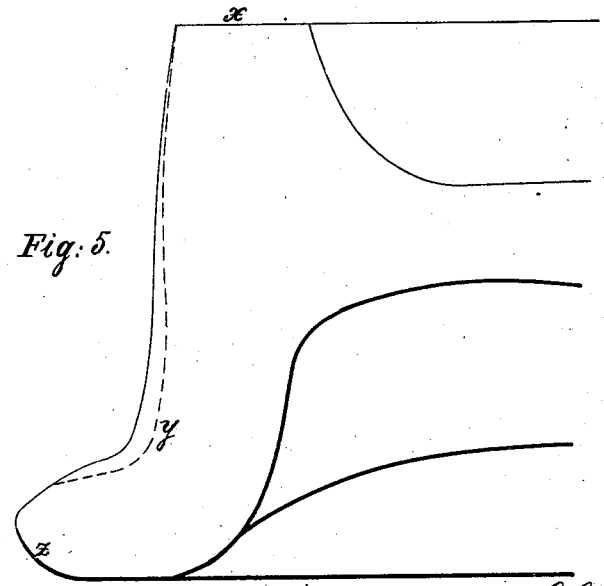

Figure 1, Sheet No. 1, is a transverse section of my improved car-wheel;

Figure 2, a face view;

Figure 3, a section of part of the wheel, drawn to an enlarged scale;

Figure 4, a sectional view of part of a Washburn wheel;

Figure 5, Sheet No. 2, a full-sized sectional view of part of a Washburn wheel; and Figure 6, a full-sized sectional view of part of my improved wheel.

A is the hub of the wheel, from which hub project the two concavo-convex plates, $a$ and $a'$, enclosing an annular space, $m$, and meeting at $x$, from which point the single plate $e$, forming a continuation of the plates $a$ and $a'$, extends to the rim D of the wheel, in the concave portion of the face of which is a number of curved ribs, $f$.

As far as the above explanation is concerned, the wheel is similar to that for which Letters Patent were granted to Nathan Washburn, October 8, 1850, a portion of which wheel is illustrated in fig. 4.

The great objection to the Washburn wheel is its liability to break on the line $y$, fig. 4, an objection which I obviate in the following manner:

It will be seen, on reference to fig. 3, in which $e$ represents part of the rim of the wheel, and $f$, one of the strengthening-ribs, that the usual flange, $h$, is continued inwards towards the centre of the wheel, so as so form, on the inner edge of the rim, an annular rib, $i$, at the edge of which the strengthening-ribs $f$ terminate, as shown in fig. 3.

In the Washburn wheel, the plate $e$ meets the rim at such a point that the flanged portion of the rim projects beyond the plate to a distance which renders the rim somewhat weak. This will be understood by reference to the lines $t\ t'$, fig. 1.

The strengthening-ribs of the Washburn wheel in part overcame this defect, but by adopting my improvement great additional strength is obtained, as will be readily understood by reference to the usual line of fracture, $w$, figs. 3 and 4.

In fact, by the arrangement of the rim D, its flange $h$, annular rib $i$, plate $e$, and strengthening-ribs $f$, a wheel much superior in strength and durability to the ordinary Washburn wheel is produced.

In addition to the strength imparted by the rib $i$, I have found that when the flange $h$ is widened to form this rib, the wheel will be "chilled" to a greater depth adjacent to the flange $h$, than when the latter retains its usual form.

This is clearly illustrated in Sheet No. 2, where the line $x\ y\ z$, fig. 5, indicates the depth to which the ordinary Washburn wheel is "chilled" or hardened in casting, the thickness of the chill being less at the point $y$ than elsewhere, although it is desirable that it should penetrate the wheel further at this point than at any other.

In my improved wheel, fig. 6, the depth of the chill is as great at the point $y$ as elsewhere, and the strength thus imparted to the wheel is much greater than results from the mere increase of thickness by the addition of the rib $i$.

I claim as my invention, and desire to secure by Letters Patent, as an improvement on the car-wheel for which Letters Patent were granted to Nathan Washburn, October 8, 1850—

The combination and arrangement of the curved plates $a\ a'$, rim D, flange $h$, strengthening-ribs $f$, and rib $i$, substantially as described.

In testimony whereof, I have signed my name to this specification, in the presence of two subscribing witnesses.

GEORGE G. LOBDELL.

Witnesses:
JOHN WHITE,
C. B. PRICE.